US012229738B1

(12) United States Patent
Fietsam et al.

(10) Patent No.: US 12,229,738 B1
(45) Date of Patent: Feb. 18, 2025

(54) MOBILE CHECK DEPOSIT SYSTEM AND METHOD

(71) Applicant: STATE FARM MUTUAL AUTOMOBILE INSURANCE COMPANY, Bloomington, IL (US)

(72) Inventors: Jeffrey A. Fietsam, Bloomington, IL (US); Robert Thurwanger, Bloomington, IL (US); Michael Pelaccio, Normal, IL (US); Pinky Desai, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 526 days.

(21) Appl. No.: 17/075,529

(22) Filed: Oct. 20, 2020

Related U.S. Application Data

(60) Provisional application No. 62/930,895, filed on Nov. 5, 2019, provisional application No. 62/923,706, filed on Oct. 21, 2019.

(51) Int. Cl.
*G06N 20/00* (2019.01)
*G06Q 20/04* (2012.01)
(Continued)

(52) U.S. Cl.
CPC ........... *G06Q 20/108* (2013.01); *G06N 20/00* (2019.01); *G06Q 20/0425* (2013.01); *G06Q 20/4012* (2013.01); *G06Q 20/40145* (2013.01); *G06Q 30/0185* (2013.01); *G06Q 40/02* (2013.01); *G06T 7/0002* (2013.01); *G06V 30/182* (2022.01); *G06Q 2220/00* (2013.01); *G06T 2207/30168* (2013.01); *G06V 20/20* (2022.01); *G06V 20/30* (2022.01);
(Continued)

(58) Field of Classification Search
CPC ............. G06Q 20/108; G06Q 20/0425; G06Q 20/4012; G06Q 20/40145; G06Q 30/0185; G06Q 40/02; G06Q 2220/00; G06N 20/00; G06T 7/0002; G06T 2207/30168; G06V 30/1444; G06V 20/20; G06V 30/10; G06V 30/1463; G06V 10/44; G06V 20/30; H04W 88/02
See application file for complete search history.

(56) References Cited

U.S. PATENT DOCUMENTS 7,950,698 B2   5/2011   Popadic et al.
8,590,940 B2   11/2013  Popadic et al.
(Continued)

*Primary Examiner* — Oneal R Mistry
*Assistant Examiner* — Duy Tran
(74) *Attorney, Agent, or Firm* — Lee & Hayes, P.C.

(57) ABSTRACT

A computer-implemented method is provided for a mobile device to detect, by a camera of the mobile device, a plurality of checks; determine, by a processing unit of the mobile device, that the image of the plurality of checks is of sufficient quality; instruct, by a display of the mobile device, a user to take a photograph of the plurality of checks; crop, by the processing unit, the photograph of the plurality of checks into a plurality of images, wherein each of the plurality of images contains one of the plurality of checks; and transmit, by a transmitter of the mobile device, the plurality of images to a server via a network. The plurality of images may be transmitted individually (i.e., one at time), or alternatively, collectively and in one payload.

20 Claims, 5 Drawing Sheets

(51) Int. Cl.
*G06Q 20/10* (2012.01)
*G06Q 20/40* (2012.01)
*G06Q 30/018* (2023.01)
*G06Q 40/02* (2023.01)
*G06T 7/00* (2017.01)
*G06T 7/11* (2017.01)
*G06V 10/40* (2022.01)
*G06V 30/182* (2022.01)
*G06V 20/20* (2022.01)
*G06V 20/30* (2022.01)
*G06V 30/14* (2022.01)
*G06V 30/146* (2022.01)
*H04W 88/02* (2009.01)

(52) U.S. Cl.
CPC ...... *G06V 30/1444* (2022.01); *G06V 30/1463* (2022.01); *H04W 88/02* (2013.01)

(56) References Cited

U.S. PATENT DOCUMENTS

| | | | |
|---|---|---|---|
| 8,688,579 B1* | 4/2014 | Ethington | G06V 10/44 705/42 |
| 8,768,038 B1* | 7/2014 | Sherman | G06T 1/0007 382/140 |
| 2004/0133516 A1* | 7/2004 | Buchanan | G06Q 20/204 705/42 |
| 2009/0141962 A1* | 6/2009 | Borgia | G06Q 20/04 705/30 |
| 2012/0030104 A1* | 2/2012 | Huff | G06Q 40/02 705/42 |
| 2014/0032406 A1* | 1/2014 | Roach | G06Q 20/042 705/42 |
| 2019/0080448 A1* | 3/2019 | Dewitt | G06V 10/243 |

* cited by examiner

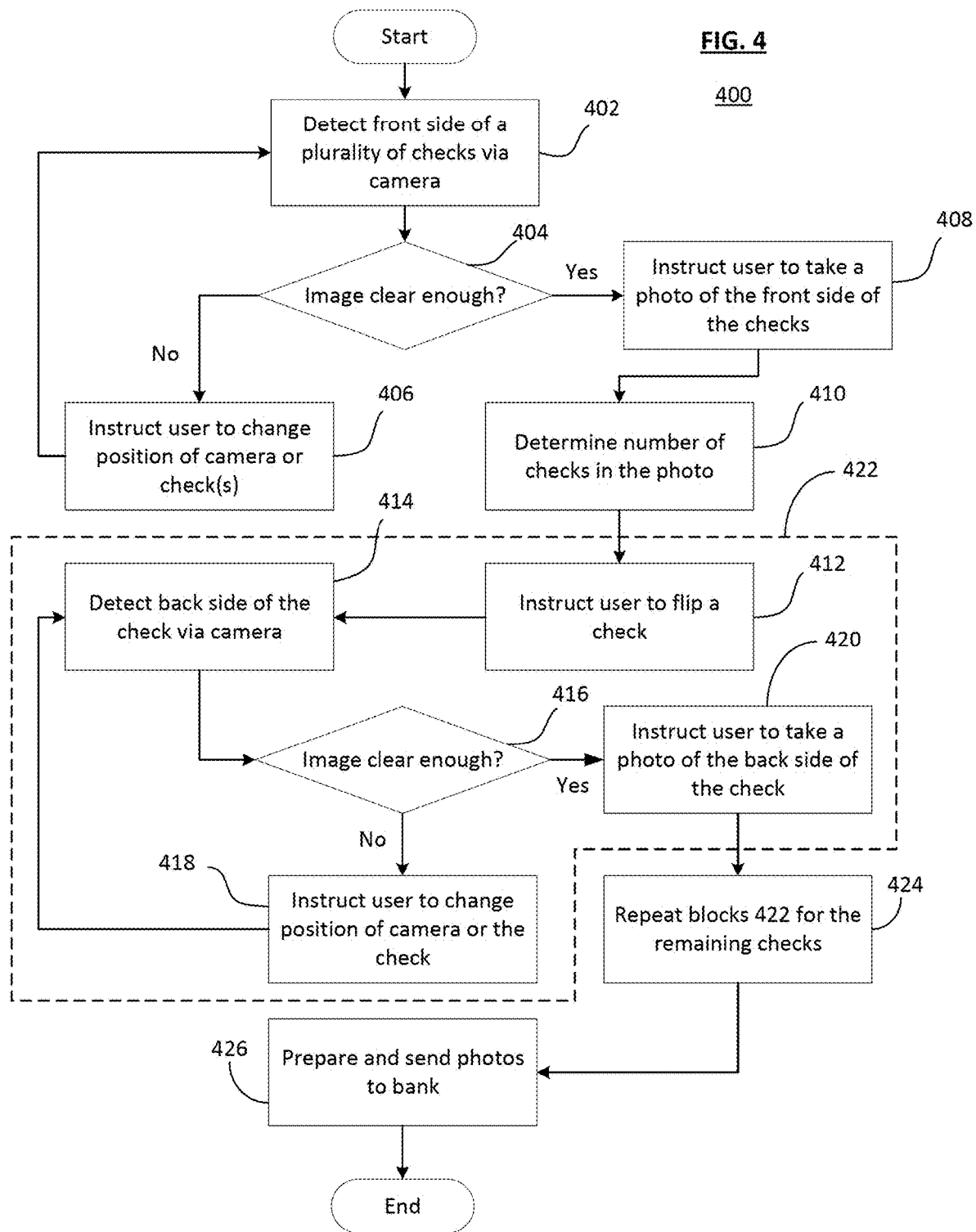

MOBILE CHECK DEPOSIT SYSTEM AND METHOD

CROSS-REFERENCE TO RELATED APPLICATIONS

The present application claims the benefit of U.S. Provisional Application No. 62/923,706, filed Oct. 21, 2019, and U.S. Provisional Application No. 62/930,895, filed Nov. 5, 2019, the subject matters of which are expressly incorporated herein by reference.

TECHNICAL FIELD

This disclosure relates generally to methods and systems for check depositing, and more particularly to check depositing using mobile devices.

BACKGROUND

Conventionally, check depositing has been permitted only if the original, physical copy of the check to be deposited was either shipped or delivered to a bank. This century, on the other hand, such original physical copies of the checks may not be required if users take photographs of the front and back side of the check to be deposited using mobile devices, such as smartphones, and transmit the photos to the bank for processing. However, when there are many checks that need to be processed, taking photos of both sides of each check one by one takes time and effort from the users.

Accordingly, there are opportunities to develop check depositing systems and methods that may improve efficiency of the check depositing process.

SUMMARY

The present embodiments may relate to, inter alia, improving the customer experience when depositing checks into a deposit account from a mobile app. The present solution may improve the customer experience by (1) verifying content and prevent submission of a picture/digital image that doesn't contain a check front, check back, or signature; (2) improving the quality of check submission and prevent submission of a picture which does not appear to be acceptable; (3) providing the ability to extract data from the check digital image (amount, check number, MICR information, routing number, name, date, etc.); and/or (4) providing the ability to submit multiple check images (front and back) in a single transaction/submission and/or single digital image. In some aspects, machine learning, computer vision, object detection, and object localization techniques may be employed.

In one aspect, a computer-implemented method for remotely depositing a check or other negotiable instrument via a mobile device may be provided. The method may be implemented via one or more local or remote processors, transceivers, sensors (including digital cameras), and/or servers. In one embodiment, the method may include (1) detecting, by a camera of the mobile device, a plurality of checks; (2) determining, by a processing unit of the mobile device, that the image of the plurality of checks is of sufficient quality; (3) instructing, by a display of the mobile device, a user to take a photograph of the plurality of checks; (4) cropping, by the processing unit of the mobile device, the photograph of the plurality of checks into a plurality of images such that each of the plurality of images contains one of the plurality of checks; and/or (5) transmitting, by a transmitter of the mobile device, the plurality of images to a server via a network. The plurality of images may be transmitted individually (i.e., one at a time), or alternatively, collectively and in one payload. The method may include (6) detecting, by the processing unit of the mobile device, an outline of the plurality of checks using an edge-detection algorithm such that the cropping of the photograph is performed along the outline of the plurality of checks. The method may also include (7) determining, by the processing unit of the mobile device, an orientation of each of the plurality of checks; (8) determining, by the processing unit, at least one of the plurality of checks that is not oriented upright; and/or (9) reorienting, by the processing unit after cropping the photograph of the plurality of checks into the plurality of images, an orientation of at least one image of the at least one of the plurality of the checks that is not oriented upright. The method may include additional, less, or alternate functionality, including that discussed elsewhere herein.

For example, in some embodiments, determining that the image of the plurality of checks is of sufficient quality may include performing or utilizing an edge-detection algorithm; determining that the image of the plurality of checks is of sufficient quality may include performing or utilizing a sharpness analysis algorithm; and/or determining that the image of the plurality of checks is of sufficient quality may include determining, by a proximity sensor of the mobile device, a distance between the plurality of checks and the camera of the mobile device. Additionally or alternatively, the method may include performing, by the processing unit, character recognition on the plurality of images to recognize information printed or written on the plurality of checks; and/or attaching, by the processing unit, the recognized information to the plurality of images when the plurality of images are transmitted to the server. Furthermore, in some embodiments, the method may also include performing, by the processing unit, user identification to verify identity of the user; and/or comparing, by the processing unit, the identity of the user with the recognized information on the plurality of images.

In another aspect, a check depositing system for remote deposit of digital images of checks may be provided. The check depositing system may include a network; a server operatively connected to the network; and a mobile device operatively connected to the network. The mobile device may include a camera that detects a digital image of a plurality of checks, a processing unit that determines that the image of the plurality of checks is of sufficient quality, and a display that instructs a user to take a photograph of the plurality of checks. The plurality of checks may be cropped by the processing unit into a plurality of images, and each of the plurality of images may contain one of the plurality of checks. The mobile device may also include a transmitter that transmits the plurality of images to the server via the network. The plurality of images may be transmitted individually and one at time, or alternatively, collectively and in one payload. The check depositing system may include additional, less, or alternate functionality, including that discussed elsewhere herein.

For instance, in one embodiment of the check depositing system, the processing unit may detect an outline of the plurality of checks using an edge-detection algorithm. The cropping may be performed along the outline of the plurality of checks. The processing unit may determine an orientation of each of the plurality of checks; determine and/or identify at least one of the plurality of checks that is not oriented upright; and/or reorient, after cropping the plurality of checks, an orientation of at least one image of the at least one of the plurality of checks that is not oriented upright. The processing unit may perform an edge-detection algorithm to determine that the image of the plurality of checks is of sufficient quality. Additionally or alternatively, the processing unit may perform a sharpness analysis algorithm to determine that the image of the plurality of checks is of sufficient quality.

In one embodiment, the mobile device may include a proximity sensor to determine a distance between the plurality of checks and the camera of the mobile device. The processing unit may determine that the image of the plurality of checks is of sufficient quality based upon the distance determined by the proximity sensor. The processing unit may perform character recognition on the plurality of images to recognize information printed or written on the plurality of checks; and/or attach the recognized information to the plurality of images when the plurality of images are transmitted to the server. Additionally or alternatively, the processing unit may perform user identification to verify identity of the user; and/or compare the identity of the user with the recognized information on the plurality of images.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of one embodiment of the disclosure taken in conjunction with the accompanying drawings, wherein:

FIG. 4 depicts an exemplary flow diagram of a computer-implemented method performed by a mobile device according to one embodiment as disclosed herein.

Figure 1:
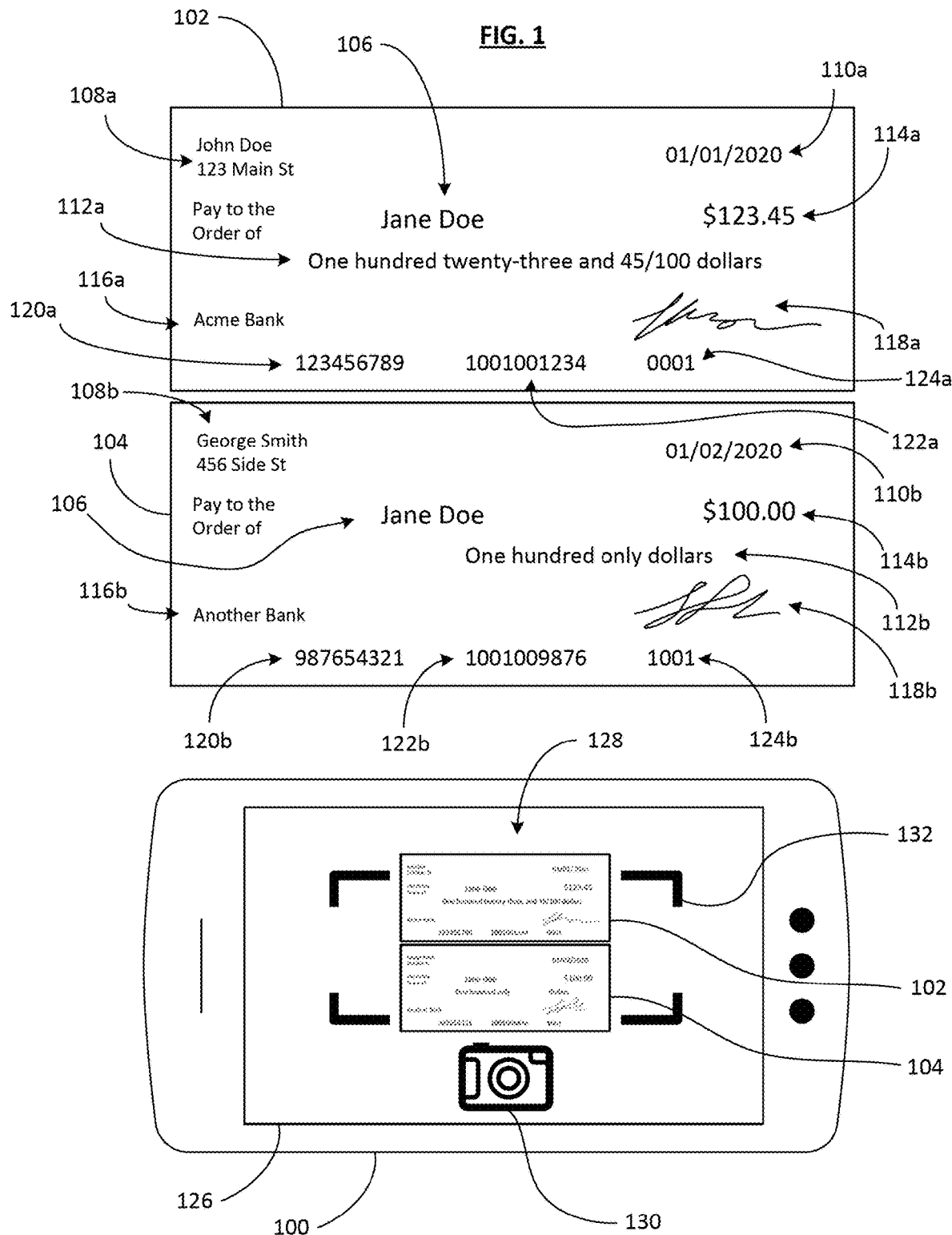
FIG. 1 depicts an exemplary layout of two checks being scanned by a mobile device according to one embodiment as disclosed herein.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates one embodiment of the disclosure, in one form, and such exemplifications are not to be construed as limiting the scope of the disclosure in any manner.

DETAILED DESCRIPTION

The present embodiments may relate to, inter alia, improving the customer experience when depositing checks into a deposit account from a mobile app. The present solution may improve the customer experience by (1) verifying content and prevent submission of a picture/digital image that doesn't contain a check front, check back, or signature; (2) improving the quality of check submission and prevent submission of a picture which does not appear to be acceptable; (3) providing the ability to extract data from the check digital image (amount, check number, MICR information, routing number, name, date, etc.); and/or (4) providing the ability to submit multiple check images (front and back) in a single transaction/submission and/or single digital image. In some aspects, machine learning, computer vision, object detection, and object localization techniques may be employed.

In other aspects, the present embodiments may train a machine learning model on a training dataset of check images (front and back), and then evaluate the performance of the model on the testing dataset using state-of-the-art machine learning tools and techniques. If a satisfactory performance threshold for the model is achieved, the model may then be optimized for the mobile device and/or a corresponding mobile app.

The trained model may detect if a digital image contains the check (called object detection) and if it does, it may return the location of the check (front or back) within the digital image (called object localization). Both object detection and object localization may happen real-time as a user takes the picture of the check with their mobile device camera. In a preferred embodiment, taking the picture of the check will be a manual step in the process (such as requiring the user to manually press a button or icon to take a digital image of the check).

The mobile application may then crop the area which contains check images from the given camera frame using the location returned to it by the ML model. Using an OCR solution, the mobile app will have the ability to extract amount and account information from the check; and verify the signature is present in the check. The mobile app may then submit the cropped check images to backend remote servers for further processing.

Exemplary Mobile Device

FIG. 1 depicts an exemplary mobile device 100, for example a user's smartphone with a camera capable of taking photographs, that is used to take photographs of a plurality of checks, in accordance with some embodiments disclosed herein. In the shown example, there are two checks 102 and 104, but in other examples, there may be three, four, or more checks that may be included in the photograph.

A front side of each check 102 or 104 includes at least the following information: name of a payee 106, name and address 108a or 108b of the payor, current date 110a or 110b, amount 112a or 112b to be paid to the payee in words, amount 114a or 114b to be paid to the payee in numeric form, bank 116a or 116b of the payor, signature 118a or 118b of the payor·routing number 120a or 120b of the payor's bank, checking account number 122a or 122b, and check number 124a or 124b of the particular check 102 or 104 that is being photographed. The routing number 120a or 120b and the checking account number 122a or 122b are located in what is called the magnetic ink character recognition (MICR) line of the respective check 102 or 104. Furthermore, although not shown, a back side of each check 102 or 104 includes a line on which the payee signs to endorse the check.

The mobile device 100 includes a screen or display 126 which shows an image 128 of the checks 102 and 104 as captured by a camera integrated into the mobile device 100. The display 126 also shows a camera icon 130 which the user presses to take a photograph of the checks 102 and 104, or in some examples to take a screenshot of the image 128 shown. In some examples, the display 126 also shows a set of guides 132 which helps the user align the checks 102 and 104 when taking the photograph.

Exemplary Mobile Check Depositing System

Figure 2:
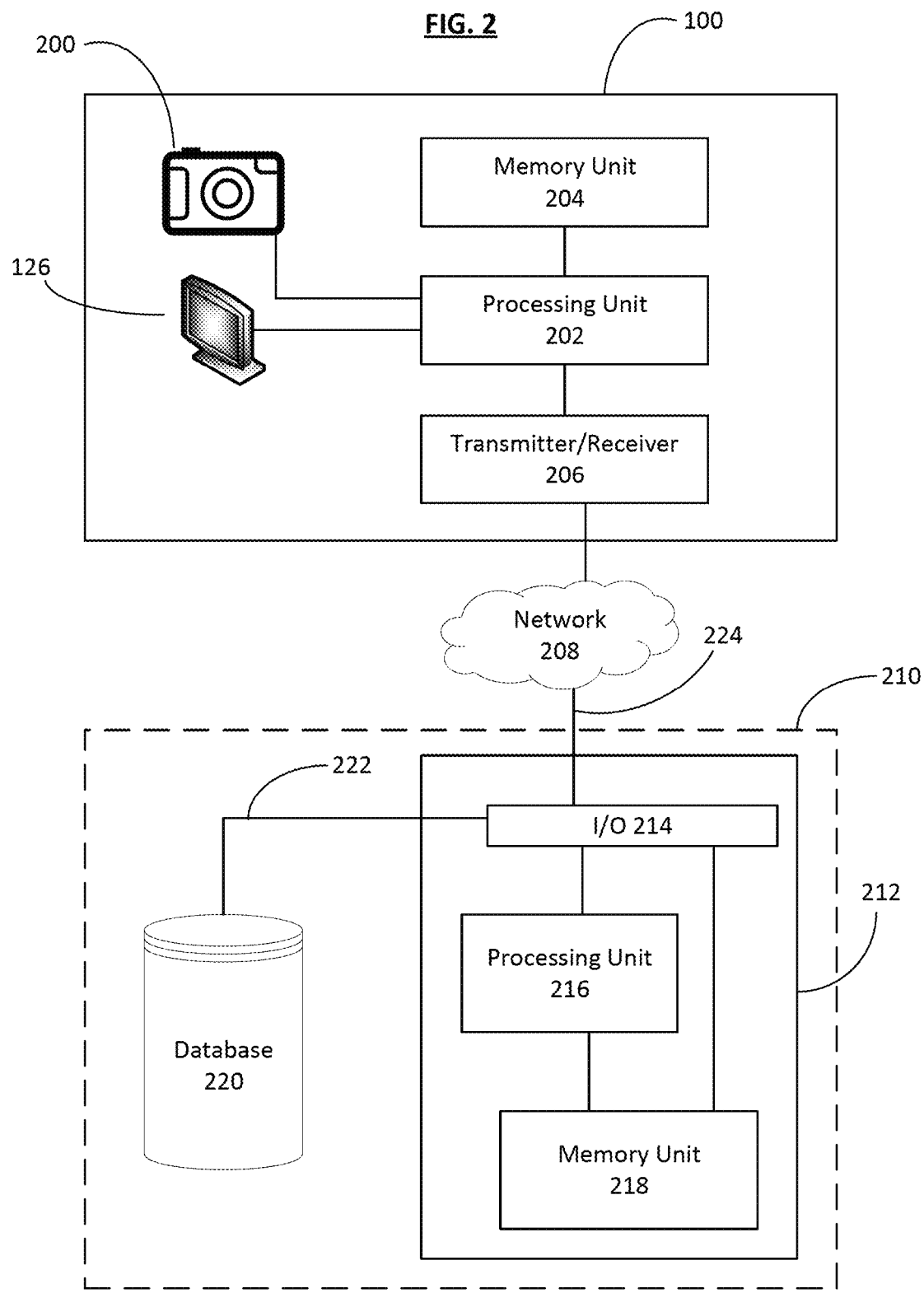
FIG. 2 depicts an exemplary schematic diagram of a mobile check depositing system according to one embodiment as disclosed herein.

FIG. 2 shows a system infrastructure in which the mobile device 100 communicates with a server 210 via a network 208. The mobile device 100 may include components such as a camera 200, a display 126, a processing unit 202, a memory unit 204, a transmitter/receiver 206, and/or additional sensors, such as a proximity sensor. In some examples, the camera 200 may be embedded into the mobile device 100, whereas in some examples, the camera 200 is functionally coupled with the mobile device 100 and detachable from the mobile device 100. The mobile device 100 may have multiple cameras in some embodiments, with each capable of acquiring digital images of one or more checks simultaneously.

In some examples, the display 126 is a touchscreen which may allow the user to input instructions by directly touching a surface of the display 126. In some examples, the display 126 is functionally coupled with an input device such as a keyboard which may allow the user to input instructions by touching or typing on the input device. The input device may be integrated in the mobile device 100, or it may be detachable from the mobile device 100, for example when not in use.

The processing unit 202 as disclosed herein may be any electronic device that is capable of processing data, for example a central processing unit (CPU), a graphics processing unit (GPU), a system on a chip (SoC), or any other suitable type of processor. The memory unit 204 may be a random-access memory (RAM), read-only memory (ROM), a flash memory, or any other suitable type of memory that enables storage of data such as instruction codes that the processing unit 202 needs to access in order to implement any method as disclosed herein.

For example, the memory unit 204 may include the instruction codes to run an algorithm to detect words and numbers on the checks 102 and 104, in order to obtain the information shown in FIG. 1. In some examples, the memory unit 204 may store instruction codes for performing Optical Character Recognition (OCR) on the photographs or images of the checks 102 and 104 to recognize the words and numbers printed thereon, such as the MICR lines, payor information 108a and 108b, and payor bank information 116a and 116b.

In some examples, the memory unit 204 may store instruction codes for handwriting analysis algorithms and also a database of numerous handwriting samples which the processing unit 202 may compare to the handwritten portions of the checks 102 and 104 to determine the words and numbers written on the checks 102 and 104. In some examples, the memory unit 204 may store instruction codes for sharpness analysis algorithms which determine the sharpness of the images, for example to determine if the camera 200 is properly focused on all of the checks 102 and 104 that are being photographed.

In some examples, the database of handwriting samples may be located remotely such that the mobile device 100 accesses the database via the network 208 instead of having to store such information within the mobile device 100. It should be noted that, although the handwriting samples are used to analyze the handwritten sections of the checks 102 and 104, the signature of the payor 118a and 118b as well as the signature of the payee on the back side of the checks 102 and 104 do not need to be analyzed, but rather the mobile device 100 should be able to discern that the checks 102 and 104 are indeed signed on the appropriate locations.

The transmitter/receiver 206 may be any suitable data transmitting/receiving device that enables the data processed by the processing unit 202 to be transmitted to the network 208, and the data from the network 208 to be received by the mobile device 100. The transmitter/receiver 206 may be designed to operate according to predetermined specifications, such as the dedicated short-range communication (DSRC) channel, wireless telephony. Wi-Fi, or other existing or later-developed communication protocols.

The network 208 is any suitable type of computer network that functionally couples at least one mobile device 100 with the server 210. The network 208 may include a proprietary network, a secure public internet, a virtual private network and/or one or more other types of networks, such as dedicated access lines, plain ordinary telephone lines, satellite links, cellular data networks, or combinations thereof. In certain embodiments where the network 208 comprises the Internet, data communications may take place over the network 208 via an Internet communication protocol.

The server 210 may further include a database 220, which may be adapted to store data related to the images of checks that are being transmitted from any number of mobile devices 100. As used herein, the term "database" may refer to a single database or other structured data storage, or to a collection of two or more different databases or structured data storage components. The data stored in the database 220 might include, for example, dates and times in which each photograph was taken and/or each image was transmitted, the bank account information for each user of the mobile devices 100, and so on.

The server 210 may include a controller 212 that is operatively connected to the database 220 via a link 222. It should be noted that, while not shown in FIG. 2, one or more additional databases may be linked to the controller 212 in a known manner. For example, separate databases may be used store data related to the bank account information of the payor, i.e., the person or organization whose name is on the check as a payor intending to transfer money to the payee who is the user of the mobile device 100. In some examples, the person who is registered to use the mobile device 100 may not be the same person as the payee of the check, in which case the mobile device 100 may incorporate an additional verification algorithm to verify the identity of the user of the mobile device 100.

As used herein, the current user of the mobile device 100 may be a spouse or other family member of the registered user of the mobile device 100, in which case the verification algorithm enables the mobile device 100 to identify the user and switch bank accounts on the software or application that is run on the mobile device 100 accordingly. The verification algorithm may be performed using biometric data such as fingerprint scanning, facial recognition, voice recognition, and/or iris recognition, or via a passcode or PIN code, as well as any other suitable method of user identification and verification. In some examples, the mobile device 100 may compare information on the checks as recognized from performing OCR as previously explained with the identity of the user, for example to determine if the user is the payer or payee indicated on the checks.

The controller 212 may include a processing unit 216 (which may be called a microcontroller or a microprocessor), a memory unit 218, and an input/output (I/O) circuit 214, all of which may be interconnected via one or more address/data bus. It should be appreciated that although only one processing unit 216 is shown, the controller 212 may include multiple processing units 216. Similarly, the memory of the controller 212 may include multiple memory units 218. Although the I/O circuit 214 is shown as a single block, it should be appreciated that the I/O circuit 214 may include a number of different types of I/O components. The memory unit 218 may be implemented as one or more semiconductor memories, magnetically readable memories, or optically readable memories, for example. The controller 212 may also be operatively connected to the network 208 via a link 224.

The server 212 may further include a number of software applications stored in memory unit 218, which may be called a program memory. The various software applications on the server 212 may include specific programs, routines, or scripts for performing processing functions associated with the methods described herein. Additionally, or alternatively, the various software applications on the server 212 may include general-purpose software applications for data processing, database management, data analysis, network communication, web server operation, or other functions described herein or typically performed by a server. The various software applications may be executed on the same computer processor or on different computer processors. Additionally, or alternatively, the software applications may interact with various hardware modules that may be installed within or connected to the server 212. Such modules may implement part of or all of the various exemplary method functions discussed herein or other related embodiments.

In some embodiments, the server 212 may be a remote server associated with or operated by or on behalf of a bank. The server 212 may be configured to receive, collect, and/or analyze images of the checks and/or other data in accordance with any of the methods described herein. The server 212 may be configured for one-way or two-way wired or wireless communication via the network 208 with a number of telematics and/or other data sources, including a third-party database operated by one or more government entities, for example. The server 212 may be in wired or wireless communications with other sources of data, including those discussed elsewhere herein.

Exemplary Check Positioning

Figure 3A:
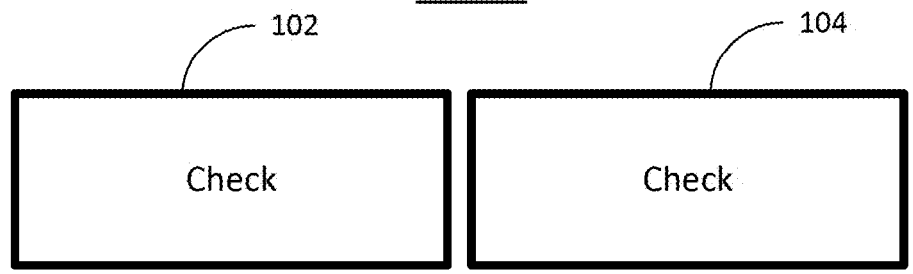
FIGS. 3A, 3B, and 3C depict different positions of two checks when being scanned according to one embodiment as disclosed herein.
Figure 3B:
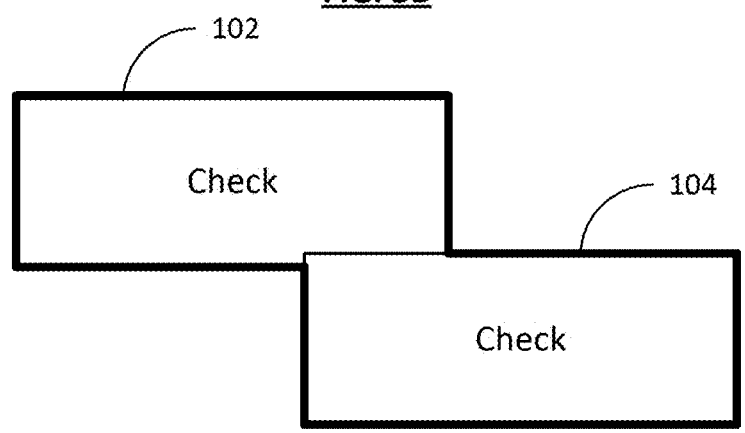
Figure 3C:
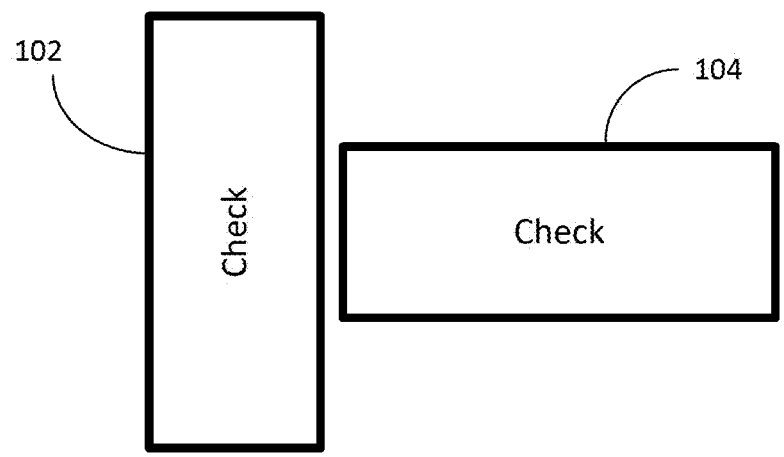

FIGS. 3A, 3B, and 3C show different shapes that may be recognized by the mobile device 100 pertaining to the checks 102 and 104 when placed in front of the camera 200. In FIG. 3A, the camera 200 captures two rectangles that are separate and distinct from one another. As such, the mobile device 100 is capable of discerning that there are two checks 102 and 104 placed side by side and substantially parallel to one another, separated by a gap therebetween.

In FIG. 3B, however, there is no gap between the checks 102 and 104, but rather the check 104 is placed partially on top of the check 102, causing a Z-shaped outline (in bold) to be formed. In this case, the mobile device 100 analyzes the image to determine if all the information regarding the payor and the payee as shown in FIG. 1 are clearly visible in the image using any method as described elsewhere herein, and determines that the image is acceptable if all such information is clearly visible. In such case, the checks 102 and 104 do not need to be realigned.

In FIG. 3C, the check 102 is placed in a different orientation from the check 104, such that while the check 104 is positioned horizontally, the check 102 is positioned vertically. In this case, the mobile device 100 analyzes the image to determine that the check 102 is positioned vertically and proceeds to analyze if the information written on the checks 102 and 104 is still clearly visible. If the information is clearly visible, the mobile device 100 determines that the checks 102 and 104 do not need to be realigned. In any of the above situations in FIGS. 3A through 3C, if the mobile device 100 determines that the information written on the checks 102 and 104 is clearly visible, the mobile device 100 then instructs the user to take a photograph of the checks 102 and 104 by pressing the camera icon 130 on the display 126, for example.

In some examples, the mobile device 100 detects the outline(s), i.e., the bold lines shown in FIGS. 3A through 3C, of the checks 102 and 104 by using an edge-detection algorithm which enables the edges to be detected by comparing colors of the checks 102 and 104 with the color(s) of the background to enable the cropping of the photograph along the detected outline(s), such as a tabletop surface or a floor surface which may include wood, tiles, carpet, linoleum, marble, as well as any other suitable material for the table or floor. Furthermore, the surface may be fabric or linen, such as a bed or tablecloth, which may have discernable patterns. Any suitable algorithm via image analysis software may be employed to determine the edges.

Exemplary Computer-Implemented Method

FIG. 4 shows a computer-implemented method 400 used by the mobile device 100 according to some embodiments to deposit the checks (for example the checks 102 and 104). In block 402, the camera 200 functionally coupled to the mobile device 100 may detect a front side of a plurality of checks. The image of the checks may be shown on the display 126 for the user to visually confirm that the entirety of the checks is captured by the camera 200.

In block 404, the mobile device 100 determines if the image of the checks is clear enough such that all the information described in FIG. 1 is clearly discernable from the image. If not, the mobile device 100 proceeds to block 406 and instructs the user to change the position of the camera 200 or at least one of the checks. For example, this may include moving the camera 200 closer to or farther from the checks, changing the angle from which the camera 200 is capturing the image of the checks, moving one or more of the checks closer to or farther from the camera 200, repositioning the one or more of the checks so that they are oriented differently, and so on. Afterwards, the camera 200 may detect the checks again and capture a new image of the checks as shown in block 402.

If the image of the checks is clear enough, the mobile device 100 proceeds to block 408 in which the mobile device 100 instructs the user to take a photograph of the front side of the checks. This may be done by showing a visible sign or mark to the user on the display 126, providing a sound or vocal instruction to notify the user, vibrating the mobile device 100 to confirm that the user may take the photograph, and so on. Once the photograph is taken, the mobile device 100 proceeds to block 410 to determine the number of checks that are in the photograph taken by the user. This may be done, for example, by determining how many sets of information are included in the photograph.

In one example, the mobile device 100 determines the number of times the name of the payee 106 (which is also the name of the user of the mobile device 100) appears in the photograph, and that number is the number of checks that is captured in the photograph. In some examples, the mobile device 100 may also extract information from the photograph, such as those shown in FIG. 1. In some particular examples, the mobile device 100 may be specifically configured to detect and extract the name and address 108a or 108*b* of the payor, the signature 118*a* or 118*b* of the payor, the routing number 120*a* or 120*b* of the payor's bank, and the checking account number 122*a* or 122*b* of the payor in the respective check 102 or 104.

In block 412 that follows, the mobile device 100 may instruct the user to flip one of the checks for the camera 200 to detect. Once it is done, and the camera 200 detects and captures an image of the back side of the check that is flipped in block 414, the mobile device 100 again confirms if the image is clear enough in block 416. If not, the mobile device 100 instructs the user to change either the position of the camera 200 or the position of the check in block 418, after which the camera 200 may detect and capture a new image of the check in block 414.

If the image is clear enough, the mobile device 100 instructs the user to take a photograph of the back side of the check in block 420. In some examples, additional steps may be inserted in which the mobile device 100 detects no signature on the back side of the check and instructs the user to sign the back side of the check in the appropriate location to endorse the check.

In view of the above, the blocks 404 and 416, which may be defined as clarity detection blocks, may incorporate one or more types of algorithms to determine if the photographs taken are of acceptable quality for the bank to process. In some examples, as further explained elsewhere herein, the algorithms include edge-detection algorithms and/or sharpness analysis algorithms. In some examples, the mobile device 100 may also include distance detection means which enable the mobile device 100 to determine how far a certain object is from the camera 200. Such distance detection means may be proximity sensors, including but not limited to infrared sensors and ultrasonic sensors. If the proximity sensors indicate that the checks are beyond a threshold distance and the user is using a zoom-in feature of the camera 200 in an attempt to take a photograph of the checks, the mobile device 100 may decide to inform the user to move physically closer to the checks to mitigate the risk of the user taking photos that are too blurry, unfocused, or unclear for practical use.

The set of blocks 412, 414, 416, 418, and 420 shown in FIG. 4 may then be repeated for each remaining check that is detected by the mobile device 100 in block 424. For example, if there are two checks, the set of blocks within block 422 is repeated just once, but if there are five checks, the set of blocks is repeated four times, i.e., until the photographs of all the checks' back sides are taken by the user. In the final block 426, the mobile device 100 may prepare the photographs taken by the user to be transmitted to the user's bank, or more specifically a server operated by the bank. In some examples, the mobile device 100 may attach information pertaining to the check as determined using OCR to the photograph of the check when the data of the photograph is transmitted to the user's bank.

Figure 5:
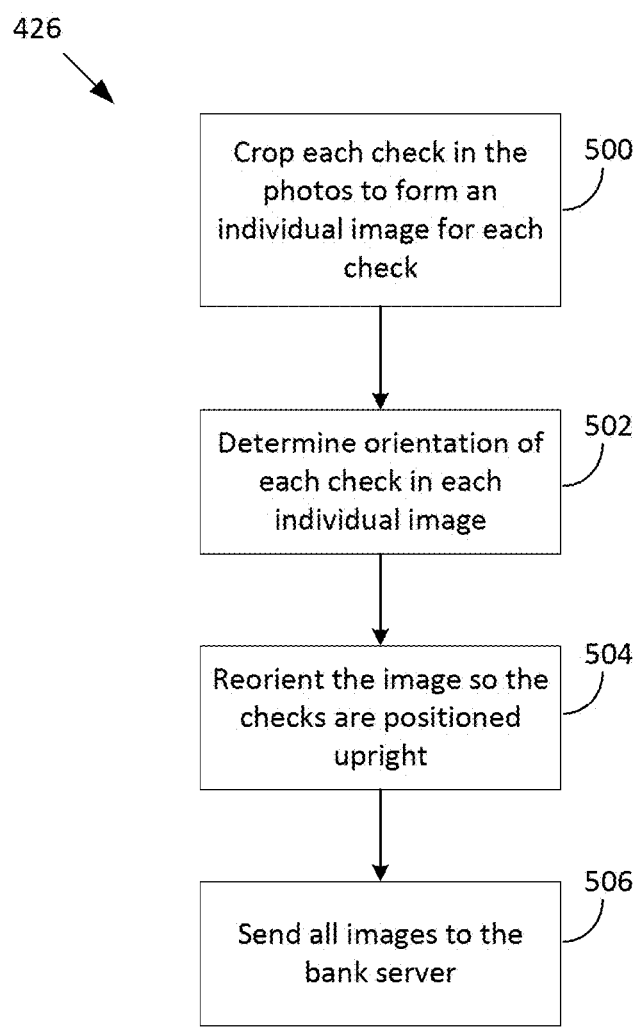
FIG. 5 depicts an exemplary flow diagram of one example step in the computer-implemented method performed by the mobile device shown in FIG. 4.

FIG. 5 shows an example of how the mobile device 100 prepares the photographs in block 426, according to some embodiments. In block 500, the image of each individual check may be cropped from the photos taken by the user to form individual images, instead of the aggregated image captured in the photograph. In block 502, the orientation of each check may be determined by the mobile device 100. For example, in the case shown in FIG. 3C, the mobile device 100 would determine the orientation of the check 102 to be vertical with respect to the camera 200 and the check 104 to be horizontal with respect to the camera 200.

In some cases, the image of the check needs to be reoriented as in block 504 such that all checks are oriented horizontally, i.e., in the direction such that all the letters and numbers on the check are upright. In the example of FIG. 3C, the check 102 would be reoriented, i.e., rotated by a number of degrees as appropriate so that it is horizontal. Lastly, in block 506, all the images are sent to the server operated or accessed by the bank.

In some examples, after all the images are cropped properly, the mobile device 100 may pair each image of the front side of a check with a corresponding image of the back side of the same check. This may be achieved by electronically tagging each image of the front side, and when the mobile device 100 instructs the user to flip the check to view its back side as in block 412 in FIG. 4, the subsequently taken photograph may be electronically tagged such that the image of the back side is paired with the image of the front side that was previously taken. Once the two sides of the same check are properly paired, the mobile device 100 may send the pair together or name each image with the appropriate names such as "check001_front" or "check001_back" such that the bank which receives the image files can sort them as corresponding to the same check.

It should be understood that although the computer-implemented methods in FIGS. 4 and 5 are described as performed by the mobile device 100, in some examples, such methods may be performed remotely, such as via one or more remote processors that are functionally coupled with the mobile device 100 via the network 208. For example, in some examples, the remote processors may have artificial intelligence capabilities that perform machine learning based upon historical data obtained by collecting and analyzing past transactions or system performances. For example, the algorithm used to recognize letters and numbers on a front side or back side of the check may be automatically modified to improve its accuracy through the use of machine learning. The mobile device 100 would only need to transfer image data to the remote processors and receive from them a resulting set of letters and numbers representing what is written on the check.

Exemplary Additional Embodiments

In one aspect, a computer-implemented method implemented by a mobile device for remote deposit may be provided. The method may include (1) detecting, by a camera of the mobile device, a plurality of checks; (2) determining, by a processing unit of the mobile device, that the image of the plurality of checks is of sufficient quality; (3) instructing, by a display of the mobile device, a user to take a photograph of the plurality of checks; (4) cropping, by the processing unit, the photograph of the plurality of checks into a plurality of images, wherein each of the plurality of images contains one of the plurality of checks; and/or (5) transmitting, by a transmitter of the mobile device, each of the plurality of images to a server via a network individually or one at time (i.e., via separate data transmissions). Alternatively, the method may include (5) transmitting, by a transmitter of the mobile device, all of the plurality of images to a server via a network in a single transmission (i.e., transmit all of the images at once, or in a single payload or single data transmission). The method may include additional, less, or alternate functionality, including that discussed elsewhere herein.

In another aspect, a computer-implemented method implemented by a mobile device for remote deposit may be provided. The method may include (1) detecting, by a camera of the mobile device, a plurality of checks; (2) determining, by a processing unit of the mobile device, that the image of the plurality of checks is of sufficient quality; (3) automatically acquiring, by the processing unit of the mobile device, a photograph of the plurality of checks; (4) cropping, by the processing unit, the photograph of the plurality of checks into a plurality of images, wherein each of the plurality of images contains one of the plurality of checks; and/or (5) transmitting, by a transmitter of the mobile device, the plurality of images to a server via a network. The method may include additional, less, or alternate functionality, including that discussed elsewhere herein.

In another aspect, a check depositing system for remote deposit via a mobile device may be provided. The system may include a network: a server operatively connected to the network; and/or a mobile device operatively connected to the network. The mobile device may include (1) a camera configured to detect an image of a plurality of checks, (2) a processing unit configured to determine that the image of the plurality of checks is of sufficient quality and then automatically take or otherwise acquire a photograph of the plurality of checks, wherein the plurality of checks may be cropped by the processing unit into a plurality of images, and each of the plurality of images contains one of the plurality of checks, and/or (3) a transmitter configured to transmit the plurality of images to the server via the network. The system may include additional, less, or alternate functionality, including that discussed elsewhere herein.

In another aspect, a check depositing system for remote deposit via a mobile device may be provided. The system may include a network: a server operatively connected to the network; and/or a mobile device operatively connected to the network. The mobile device may include (1) a camera configured to detect an image of a plurality of checks, (2) a processing unit configured to determine that the image of the plurality of checks is of sufficient quality, (3) a display configured to instruct a user to take a photograph of the plurality of checks, wherein the plurality of checks are cropped by the processing unit into a plurality of images, wherein each of the plurality of images contains one of the plurality of checks, and/or (4) a transmitter configured to transmit each of the plurality of images to the server via the network individually or one at time (i.e., each transmission from the mobile device to the network only includes images and/or other data associated with a single check). Alternatively, the mobile device may include (4) a transmitter configured to transmit all of the plurality of images to the server via the network collectively or in a single data transmission (i.e., the mobile device transmits all of the images of all the checks in a single payload or transmission). The system may include additional, less, or alternate functionality, including that discussed elsewhere herein.

ADDITIONAL CONSIDERATIONS

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations.

A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware is temporarily configured (e.g., programmed), the hardware need not be configured or instantiated at any one instance in time. Software may accordingly configure a processor, for example, to constitute a particular hardware module at one instance of time and to constitute a different hardware module at a different instance of time. Hardware elements may provide information to, and receive information from, other hardware elements. Accordingly, the described hardware may be regarded as being communicatively coupled.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Similarly, the methods or routines described herein may be at least partially processor-implemented. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary. "or" refers to an inclusive or and not to an exclusive or. In addition, use of the "a" or "an" are employed to describe elements and components of the embodiments herein. This is done merely for convenience and to give a general sense of the description. In this description, and the claims that follow, the singular also includes the plural unless it is obvious that it is meant otherwise. This detailed description is to be construed as exemplary only and does not describe every possible embodiment, as describing every possible embodiment would be impractical, if not impossible. One could implement numerous alternate embodiments, using either current technology or technology developed after the filing date of this application.

The embodiment disclosed herein is not intended to be exhaustive or limit the disclosure to the precise form disclosed in the following detailed description. Rather, the embodiment is chosen and described so that others skilled in the art may utilize its teachings. One of ordinary skill in the art will realize that the embodiments provided may implemented in hardware, software, firmware, and/or a combination thereof. Programming code according to the embodiments may be implemented in any viable programming language or a combination of programming languages.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

What is claimed is:

1. A computer-implemented method implemented by a mobile device for remote deposit, the computer-implemented method comprising:

detecting, by a camera of a mobile device registered to a first user, a digital image of a plurality of objects;

determining, via object detection and object localization, and using a machine learning model trained on a training dataset of check images by a processing unit of the mobile device prior to a photograph of the plurality of objects being taken using the mobile device, (1) that the plurality of objects in the digital image comprise a plurality of checks and (2) respective locations of individual checks of the plurality of checks in the digital image;

determining, by the processing unit, that the digital image of the plurality of checks as detected is of sufficient quality;

in response to determining that the digital image of the plurality of checks is of the sufficient quality, generating, by the processing unit, an instruction for a photograph of the plurality of checks to be taken;

causing, by the processing unit, the instruction to be presented on a display of the mobile device;

cropping, using the machine learning model, by the processing unit, and based upon the respective locations of the individual checks as determined, the photograph of the plurality of checks into a plurality of cropped images, wherein each of the plurality of cropped images contains one of the plurality of checks;

determining, by the processing unit and based on biometric data collected via a sensor of the mobile device, that a current user of the mobile device is a second user different from the first user;

based on determining that the current user is different from the first user, creating, by the processing unit, an association between the plurality of cropped images and a financial account of the second user; and transmitting, by a transmitter of the mobile device, the plurality of cropped images, and an identifier uniquely identifying the financial account of the second user, to a server via a network.

2. The computer-implemented method of claim 1, further comprising:

detecting, by the processing unit, an outline of the plurality of checks using an edge-detection algorithm, wherein the cropping of the photograph is performed along the outline of the plurality of checks.

3. The computer-implemented method of claim 1, further comprising:

determining, by the processing unit, an orientation of each of the plurality of checks;

determining, by the processing unit, at least one of the plurality of checks that is not oriented upright; and reorienting, by the processing unit after cropping the photograph of the plurality of checks into the plurality of cropped images, an orientation of at least one cropped image of the at least one of the plurality of checks that is not oriented upright.

4. The computer-implemented method of claim 1, wherein determining that the digital image of the plurality of checks is of the sufficient quality comprises performing edge-detection algorithm.

5. The computer-implemented method of claim 1, wherein determining that the digital image of the plurality of checks is of the sufficient quality comprises performing sharpness analysis algorithm.

6. The computer-implemented method of claim 1, wherein determining that the digital image of the plurality of checks is of the sufficient quality comprises determining, by a proximity sensor of the mobile device, a distance between the plurality of checks and the camera of the mobile device.

7. The computer-implemented method of claim 1, further comprising:

performing, by the processing unit, character recognition on the plurality of cropped images to recognize information printed or written on the plurality of checks; and attaching, by the processing unit, the recognized information to the plurality of cropped images when the plurality of cropped images are transmitted to the server.

8. The computer-implemented method of claim 1, wherein determining the plurality of objects comprise the plurality of checks and determining the respective locations of the plurality of checks occur simultaneously with detecting the digital image.

9. The computer-implemented method of claim 1, further comprising:

establishing, by the processing unit, an association between the plurality of cropped images and a financial account of the first user.

10. The computer-implemented method of claim 1, wherein determining that the current user of the mobile device is the second user is further based at least in part on a passcode.

11. A check depositing system for remote deposit via a mobile device, the system comprising:

a network;

a server operatively connected to the network; and a mobile device operatively connected to the network, the mobile device registered to a first user and comprising:

a camera configured to detect a digital image of a plurality of objects, a sensor configured to collect biometric data;

a processing unit configured to:

determine, using a machine learning model trained on a training dataset of check images prior to a photograph of the plurality of objects being taken using the mobile device, (1) that the plurality of objects in the digital image comprise a plurality of checks and (2) respective locations of individual checks of the plurality of checks in the digital image, and determine that the digital image of the plurality of checks as detected is of sufficient quality; and in response to the processing unit determining that the digital image of the plurality of checks is of the sufficient quality, generate an instruction for a photograph of the plurality of checks to be taken;

a display configured to present the instruction, wherein the photograph of the plurality of checks is cropped using the machine learning model by the processing unit into a plurality of cropped images based upon the respective locations of the individual checks as determined, wherein each of the plurality of cropped images contains one of the plurality of checks, the processing unit further configured to (1) determine, based on biometric data collected via the sensor of the mobile device, that a current user of the mobile device is a second user different from the first user, and (2) based on determining that the current user is different from the first user, creating an association between the plurality of cropped images and a financial account of the second user; and a transmitter configured to transmit the plurality of cropped images to the server via the network.

12. The check depositing system of claim 11, wherein the processing unit is configured to detect an outline of the plurality of checks using an edge-detection algorithm, wherein the cropping is performed along the outline of the plurality of checks.

13. The check depositing system of claim 11, wherein the processing unit is configured to:

determine an orientation of each of the plurality of checks;

determine at least one of the plurality of checks that is not oriented upright; and reorient, after cropping the photograph of the plurality of checks into the plurality of cropped images, an orientation of at least one cropped image of the at least one of the plurality of checks that is not oriented upright.

14. The check depositing system of claim 11, wherein the processing unit is configured to perform edge-detection algorithm to determine that the digital image of the plurality of checks is of the sufficient quality.

15. The check depositing system of claim 11, wherein the processing unit is configured to perform sharpness analysis algorithm to determine that the digital image of the plurality of checks is of the sufficient quality.

16. The check depositing system of claim 11, wherein the mobile device further comprises a proximity sensor to determine a distance between the plurality of checks and the camera of the mobile device, wherein the processing unit is configured to determine that the digital image of the plurality of checks is of the sufficient quality based upon the distance determined by the proximity sensor.

17. The check depositing system of claim 11, wherein the processing unit is further configured to:

perform character recognition on the plurality of cropped images to recognize information printed or written on the plurality of checks; and attach the recognized information to the plurality of cropped images when the plurality of cropped images are transmitted to the server.

18. The check depositing system of claim 11, wherein determining the plurality of objects comprise the plurality of checks, and the respective locations of the plurality of checks are determined simultaneously with detection of the digital image.

19. The check depositing system of claim 11, wherein determining that the current user of the mobile device is the second user is further based at least in part on a passcode.

20. The check depositing system of claim 17, wherein performing the character recognition comprises performing handwritten character recognition of handwritten text.

* * * * *